(12) United States Patent
Verma et al.

(10) Patent No.: US 12,260,480 B2
(45) Date of Patent: Mar. 25, 2025

(54) MACHINE LEARNING-BASED LAYOUT GENERATION

(71) Applicant: Adobe Inc., San Jose, CA (US)

(72) Inventors: Sukriti Verma, Pittsburgh, PA (US); Venkata naveen kumar Yadav Marri, San Jose, CA (US); Ritiz Tambi, San Francisco, CA (US); Pranav Vineet Aggarwal, Santa Clara, CA (US); Peter O'Donovan, Seattle, WA (US); Midhun Harikumar, Sunnyvale, CA (US); Ajinkya Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/178,791

(22) Filed: Mar. 6, 2023

(65) Prior Publication Data

US 2024/0303881 A1    Sep. 12, 2024

(51) Int. Cl.
*G06T 11/60*  (2006.01)
*G06F 3/0482*  (2013.01)

(52) U.S. Cl.
CPC ............ *G06T 11/60* (2013.01); *G06F 3/0482* (2013.01); *G06T 2200/24* (2013.01)

(58) Field of Classification Search
CPC .... G06T 11/60; G06T 2200/24; G06F 3/0482
See application file for complete search history.

(56) References Cited

U.S. PATENT DOCUMENTS

| | | | |
|---|---|---|---|
| 2020/0372206 A1* | 11/2020 | Fialkow | G06F 16/986 |
| 2021/0150201 A1* | 5/2021 | Reisswig | G06T 7/70 |
| 2021/0200942 A1* | 7/2021 | Jovanovic | G06F 40/106 |
| 2023/0259800 A1* | 8/2023 | Alkan | G06N 7/01 |
| | | | 706/11 |

OTHER PUBLICATIONS

Gupta et al., "LayoutTransformer: Layout Generation and Completion with Self-attention", 2020, 17 pages.

* cited by examiner

*Primary Examiner* — Sherrod L Keaton
(74) *Attorney, Agent, or Firm* — NICHOLSON DE VOS WEBSTER & ELLIOTT LLP

(57) ABSTRACT

Embodiments are disclosed for machine learning-based generation of recommended layouts. The method includes receiving a set of design elements for performing generative layout recommendation. A number of each type of design element from the set of design elements is determined. A set of recommended layouts are generated using a trained generative layout model and the number and type of design elements. The set of recommended layouts are output.

17 Claims, 9 Drawing Sheets

MACHINE LEARNING-BASED LAYOUT GENERATION

BACKGROUND

Content layout libraries provide a useful resource for content creators. For example, content layout libraries allow users to find a layout of existing content that can be incorporated into a new content project or serve as inspiration to create new content. Given the wide variety of layouts available, finding a desired layout for a particular group of content items can be challenging. Typical layout recommendation systems attempt to assist users by using user content. This guides a search of a content layout library to identify existing layouts that include similar content.

SUMMARY

Introduced here are techniques/technologies that relate to generating recommended layouts from a set of design inputs. To generate the recommended layouts, embeddings are created to represent each design input of the set of design inputs. These design inputs may include text, images, shapes, etc. The design elements are tokenized, and the resulting tokens are used to create embeddings that represent the design elements. In particular, tokenization captures the features of each design element (shape, size, orientation, etc.) which enables these features to be represented by the resulting embeddings. The embeddings are input into a layout generator which one or more new sets of tokens that represent the same design elements but with new positions, new sizes, etc. These new tokens can then be used to generate recommended layouts.

If the design inputs include an existing layout that defines positions or perceptual relationships between the design inputs, a trained machine learning model processes an image of the existing layout. This generates an image embedding that represents perceptual features of the design inputs that is used as an additional input to the layout generator. Using the image embedding, the layout generator can generate recommended layouts with a customizable similarity to the existing layout.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
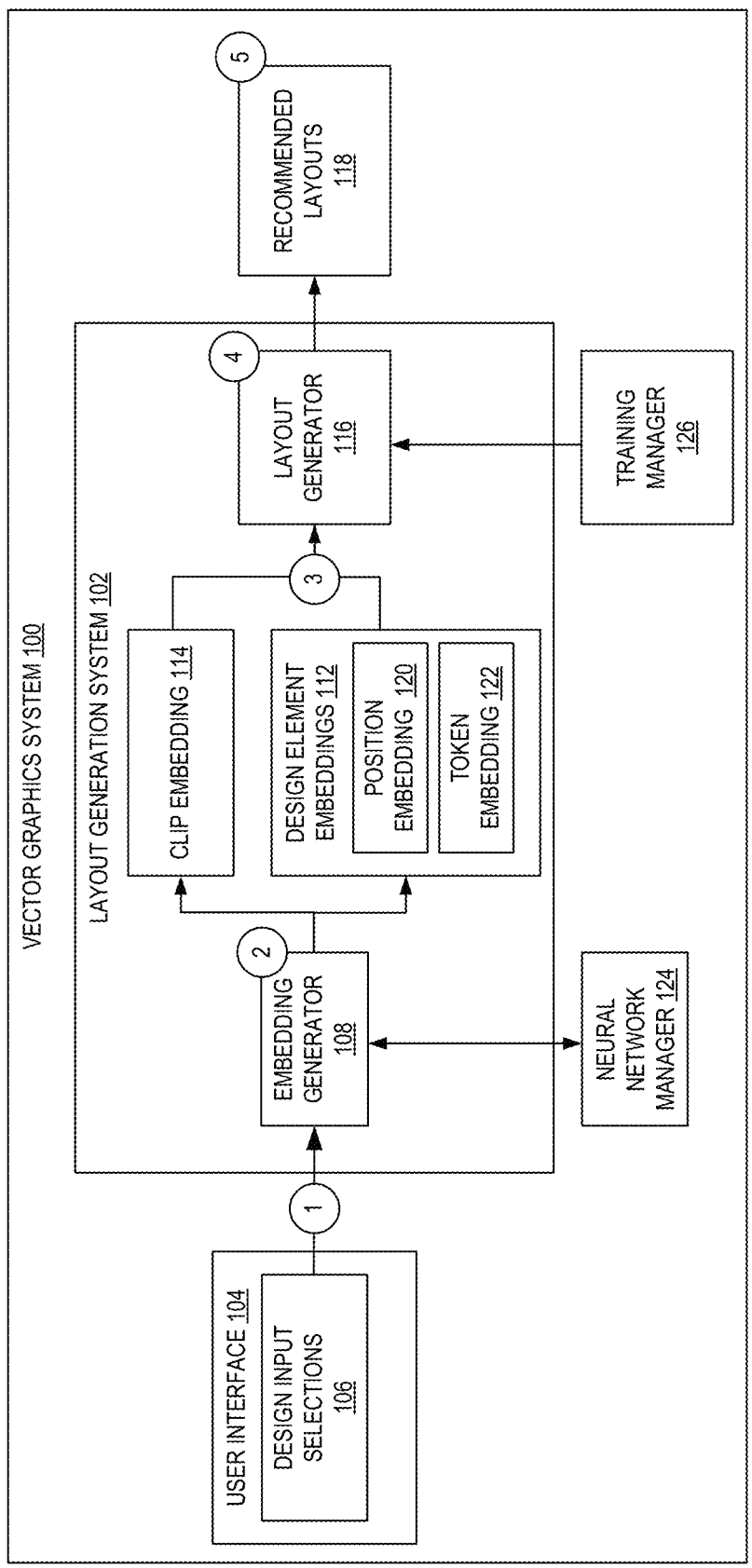
FIG. 1 illustrates a diagram of a process of generating recommended layouts from design inputs in accordance with one or more embodiments.

One or more embodiments of the present disclosure include a vector graphics system including a layout generation system that generates recommended layouts from a set of design inputs. Layout generation is a process of producing different content layouts from design inputs that include text, images, or shapes. The set of design inputs can also include an existing layout that defines positions or relative sizes between the text, images, or shapes in the set of design inputs.

In existing techniques, recommended layouts are determined by repositioning the original design elements (e.g., text, images, etc.) of the user's content layout elements by mapping the original design elements to positions of similar design elements in existing layout options. These existing layout options lack any customization to the existing layouts based on the original design elements or user's content layout. The existing layout options are fixed and non-adjustable to address a user's original design elements. Additionally, these approaches require layouts to be manually created beforehand by designers and content creators. The ability to create unique new content layouts has become a specialized skill. Often, searching using a content layout returns layouts that all look similar and lack creativity. These search results can produce inadequate and a frustrating experience for the user.

In another existing technique, the graphic designer must move and edit each object separately the size and position until a desired layout is produced. Moving each object and then manually adjusting the size and position of each object often results in an iterative design process. This will produce layouts that are often similar based on the preferences of each graphic designer.

To address these and other deficiencies in conventional systems, embodiments apply generative machine learning to design inputs to generate new layouts beyond existing designs. After the design inputs are tokenized, machine learning models are applied to produce embeddings that represent the tokens of the design inputs. The generative machine learning model uses the embeddings output from the machine learning models to produce innovative recommended layouts. In turn the combined design inputs produce new layouts that move beyond matching existing layouts.

In an example, if a graphic designer wants to create a new layout, using existing techniques, the graphic designer must select a design from existing layouts that are similar in design and layout. Alternatively, the graphic designer must move each object individually to create a new layout. This process is often time-consuming or requires an exceptional level of skill.

To provide a more accessible model that can be used by average designers, embodiments permit a graphic designer to provide a set of design inputs to a layout generation system to generate new layouts. The layout generation system tokenizes the set of design inputs to represent each of the design inputs. Each token represents a design element such as an image element, text element, or shape element. By using tokens of the design inputs, the layout generation system creates novel layouts by predicting a new arrangement of tokens.

FIG. 1 illustrates a diagram of a process of generating recommended layouts from design inputs in accordance with one or more embodiments. As depicted in FIG. 1, a vector graphics system 100 includes a layout generation system 102 that includes embedding generator 108 and layout generator 116. The vector graphics system 100 includes a user interface 104 that receives design input selections 106. In some embodiments, the embedding generator 108 or layout generator 116 is implemented as a module in the layout generation system 102 or another computing application.

At numeral 1, the embedding generator 108 obtains design input selections 106 from the user interface 104. The design input selections 106 identifies a set of design inputs such as text, images, or shapes that are selected for generating a recommended layout. In an example, the design input selections 106 identify an image element, text element, or shape element. In some embodiments, the design input selections 106 include an existing layout that is created by the designer. To include the existing layout, the design input selections 106 have one or more defined relationships between the image elements, text elements, or shape elements. For example, the design input selections include position data that includes an origin point (x, y) and a height and width (h, w) of each of the elements. The existing layout includes multiple design elements which can include the image element, text element, or shape element. Additional details on the design inputs are described below.

At numeral 2, embedding generator 108 generates embeddings for the design inputs identified by the design input selections 106. The embedding generator 108 is a subsystem of the layout generation system 102 that tokenizes the design inputs and applies one or more machine learning models to the set of tokens to produce embeddings of the design inputs. To generate the embeddings, the design inputs identified by the design input selections 106 are tokenized by the embedding generator 108 with each token including a type of design input and a position or size of the design input.

In an example, a shape element identified by the design input selections 106 has a bounding box that has an initial point (e.g., a top left corner) at [0,0] and a width of 180 pixels and a height of 200 pixels. The token generated for this shape element by the embedding generator 108 is [shape, 0, 0, 180, 200]. The embedding generator 108 requests the token to be processed by a trained neural network from a neural network manager 124. The trained neural network is trained to receive the tokens and generate embedding spaces such as a position embedding 120 and token embedding 122. An example of the trained neural network includes two layers that learn the position embedding 120 and token embedding 122. Additional details of the embeddings are described below.

In some embodiments, if the design input selections 106 include an existing layout. The existing layout defines a position or perceptual features of the design inputs (e.g., a relative size between a text element and a shape element) the embedding generator 108 accesses an image embedding (e.g., CLIP) model to produce an image embedding 114 from an image of the existing layout. The CLIP model recognizes a wide variety of perceptual features in images and assigns a label (e.g., textbox, image, dog, cat, etc.). The CLIP model generates an embedding representation of relationships between perceptual features such as "tightly packed," "sparsely packed," or "text in groups" or other perceptual aspects. The image embedding 114 is used by the layout generator 116 to represent perceptual features of the existing layout as an input to the layout generator 116.

At numeral 3, the image embedding 114 and the design element embeddings 112 are concatenated prior to being provided as an input to the layout generator 116. For example, the image embedding 114 and the design element embeddings 112 can be combined using vector or matrix operations. In some embodiments, if the design input selections 106 do not include an existing layout, the design element embeddings 112 including the position embedding 120 and the token embedding 122 are concatenated and no image embedding 114 is included. If no existing layout is included, the layout generator 116 produces recommended layouts from the elements of the design input selections 106 as described in additional detail below with reference to FIG. 2. If an existing layout is included, the layout generator 116 produces recommended layouts from the design input selections 106 and the image embedding 114 as described in additional detail below with reference to FIG. 3. In some embodiments, the image embedding 114 is generated by a Contrastive Language-Image Pre-training model (CLIP). In other embodiments, the image embedding 114 is generated by another text-to-visual machine learning embedding, such as by using query-based training data to initiate a search of digital images and a selection of a digital image from the search result. In this way, association of the text query with the digital image may be determined for a multitude of digital images and text. The use of query-based training data may also be expanded through use of title-based training data as part of multi-task learning, which improves training accuracy by limiting noise in the query-based training data and supports use of long text sequences.

At numeral 4, the layout generator 116 receives the design element embeddings 112 and/or the image embedding 114. The layout generator 116 is trained to generate a set of recommended layouts from the received embeddings. In some embodiments, the layout generator is a generative transformer that uses deep learning to produce recommended layouts. The generative transformer is trained to predict the next token given a set of embeddings that represent existing tokens. For example, the layout generator 116 receives an embedding that represents the set of tokens corresponding to the design inputs and predicts a new arrangement of tokens. The prediction with the arrangement of tokens represents a new layout. In an example, the layout generator is an autoregressive language model based on the transformer architecture, pre-trained in a generative and unsupervised manner. The layout generator receives embeddings as described above and generates a prediction which corresponds to the position and orientation of design inputs in a layout.

At numeral 5, the layout generation system outputs a set of recommended layouts 118. The set of recommended layouts 118 includes one or more layouts generated by the layout generator 116. The set of recommended layouts 118 can be presented to the user via a user interface or stored in a cache or non-volatile memory device.

Figure 2:
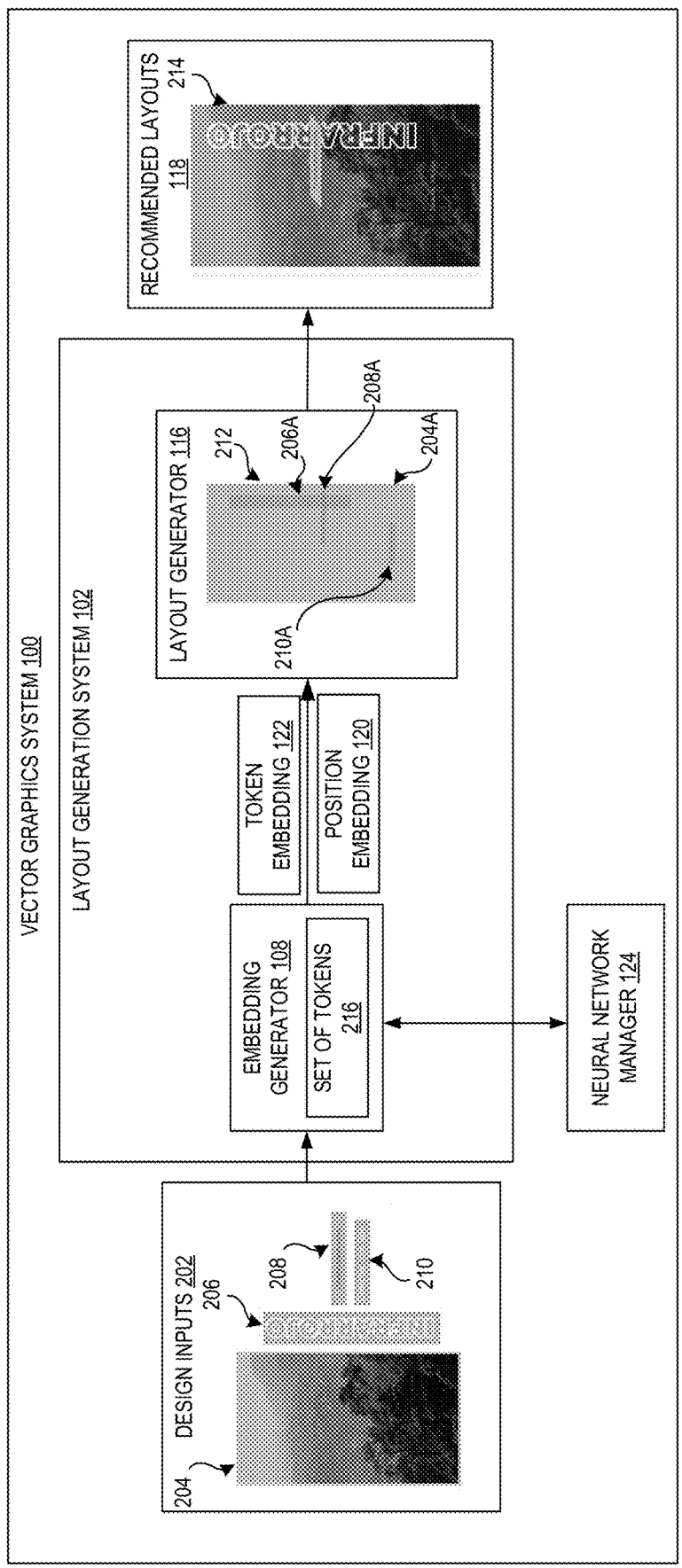
FIG. 2 illustrates a visual representation of generating recommended layouts from design inputs in accordance with one or more embodiments.

FIG. 2 illustrates a visual representation of generating recommended layouts from design inputs in accordance with one or more embodiments. For instance, embedding generator 108 receives the design inputs 202 that are identified by the design input selections 106 as described above. As illustrated by FIG. 2, the design inputs 202 include a shape element 204, a first text element 206, a second text element 208, and a third text element 210. The embedding generator 108 creates a set of tokens 216 including each of the design inputs 202. While FIG. 2 describes tokens as having a type, origin point (x, y), and a width and height, additional attributes such as orientation angle, colors, and other attributes can be represented in the token.

In an example, the set of tokens 216 generated by the embedding generator 108 for the design inputs 202 is [(shape, 0, 0, 255, 255); (text1, 0, 0, 255, 150), (text2, 0, 0, 165, 100), (text3, 0, 0, 150, 75)], where shape represents the shape element 204, text1 represents the first text element 206, text2 represents the second text element 208, and text3 represents the third text element 210. In this example, each of the design inputs 202 has an origin point of [0,0] (e.g., the top-left corner of a layout), however, these origin points can also be assigned in a random, or pseudo-random process when there is no existing layout in the design inputs 202. While the description above describes the different text elements as having numerals to distinguish them from other text elements, the label can be common such as "text" for multiple text elements.

In other examples, the origin points are assigned based on a position within an existing layout when the existing layout is included in the design inputs 202. In addition to the origin point, each token includes a size of the object, such as width and height, that is represented by height and width from the origin point. In the example above, [(shape, 0, 0, 255, 255)] represents that the shape element 204 is the same size of a layout (256×256 pixels) while (text1, 0, 0, 255, 150) represents the first text element 206 which has a first dimension that is the same size as the layout (e.g., the width direction) and a second dimension that is less than the size of the layout (e.g., the height direction).

As described above, the embedding generator 108 accesses the machine learning models hosted by neural network manager 124 to generate the token embedding 122 and the position embedding 120 from the set of tokens 216. The token embedding 122 includes the type of design input (e.g., text, image, shape) and the position or size. The position embedding 120 includes an origin point (e.g., an x-y coordinate) and a size is represented by pixel dimensions of the height and width.

The layout generator 116 receives the token embedding 122 and the position embedding 120 and generates a layout template 212. The layout template 212 includes bounding boxes that represent each of the design inputs 202. As illustrated by FIG. 2, the layout template 212 includes bounding boxes 204A-210A that correspond to shape element 204, first text element 206, second text element 208, and third text element 210 respectively. While FIG. 2 illustrates one layout template 212, the layout generator 116 can produce any number of layout templates from the token embedding 122 and the position embedding 120. The layout generation system 102 renders the design inputs onto the layout template 212 to generate the rendered layout 214 that is output as recommended layout 118. For instance, as described above, the vector graphics system 100 generates an output visualization that includes recommended layout 118. The recommended layout 118 is output by the layout generation system 102 such as to a presentation device or a client device. While FIG. 2 illustrates the recommended layouts 118 including a single rendered layout 214, any number of rendered layouts can be included.

As described above, the layout generator 116 is an autoregressive language model based on the transformer architecture that is trained to predict additional members of a set (e.g., sentence prediction) based on input embeddings that represent the tokens (e.g., existing words in a sentence). The layout generator 116 performs prediction of a token sequence where the token sequence represents positions, sizes, and orientations of design inputs in a recommended layout. By using this approach, the layout generator 116 effectively generates new layouts by processing the embeddings as a sentence structure and outputting a "predicted sentence" that represents a recommended layout using an output arrangement of tokens.

Figure 3:
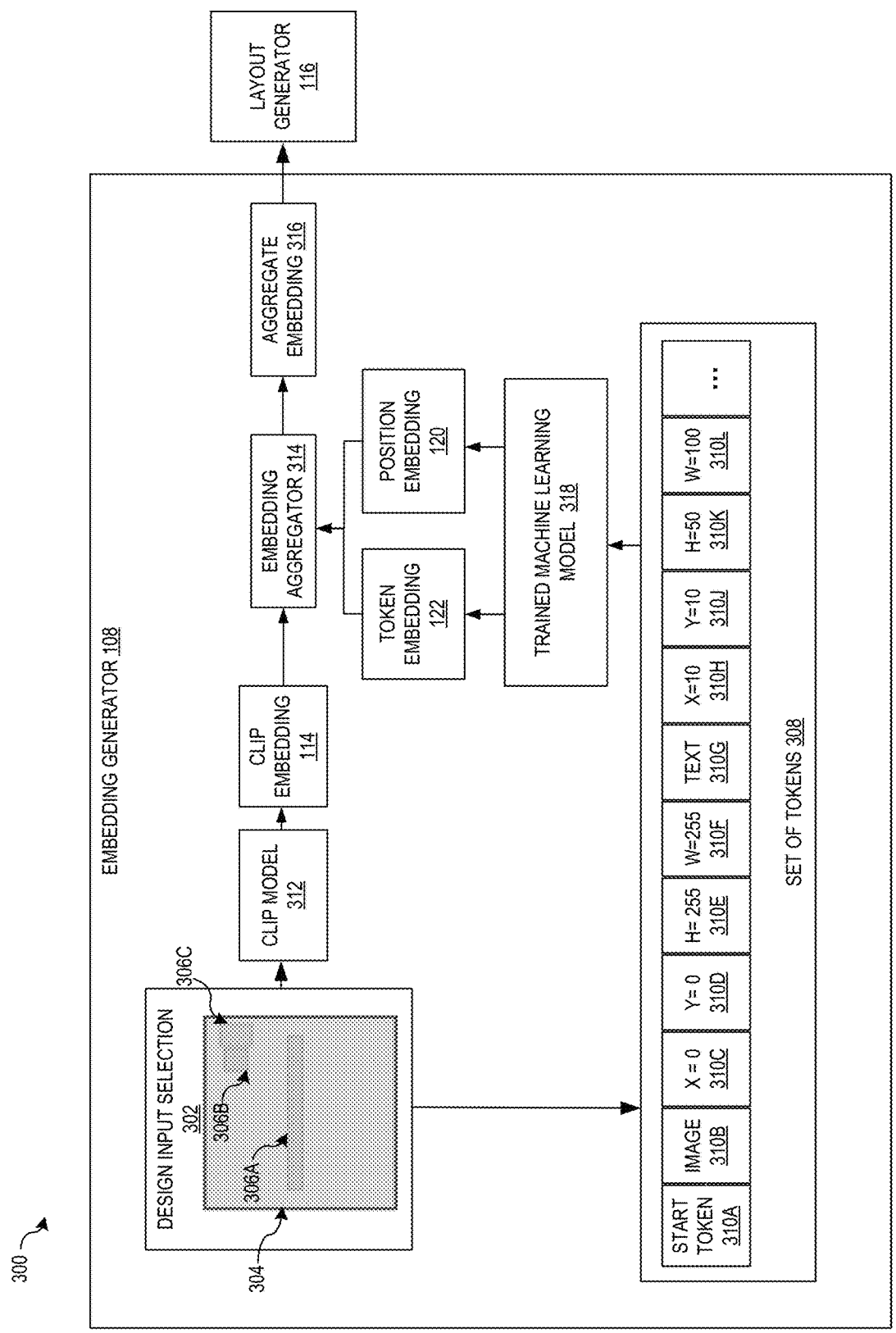
FIG. 3 illustrates an example of an embedding generator in accordance with one or more embodiments.

FIG. 3 illustrates an example of embedding generator in accordance with one or more embodiments. As described above, the design inputs 302 are received for generating recommended layouts. The design inputs are processed by the embedding generator 108 as described above. As illustrated by FIG. 3, the design inputs 302 includes an existing layout with a background image 304 and design inputs 306A, 306B, and 306C, collectively "design inputs 306." The embedding generator 108 generates a set of tokens 308 that represent the design inputs 306 and an image embedding 114 from the design inputs 302.

To create the set of tokens 308, the embedding generator 108 creates a natural language token 310A-310L for each of the design inputs 306. Each token 310A-310L identifies a particular feature of design input based on specific rules of the embedding generator 108. For example, the embedding generator 108 creates a token with a minimum set of attributes as origin point-x, origin point-y, height, and width of an image element of the design inputs 306, however, can also include additional attributes such as aspect ratio, area, and other attributes. An example of a rule of the embedding generator 108 is that a token for an image element is assigned null values for the origin points (x, y) when an existing layout is not included in the design inputs 306. If an existing layout is included in the design inputs 306, the embedding generator 108 assigns values for the origin points (x, y) that correspond to a position of the image element.

The set of tokens 308 includes tokens 310A-310L. In some examples, the tokens 310A-310L can also be grouped by design input. As illustrated by FIG. 3, the tokens 310B-310F correspond to features of the background image 304 of the existing layout. The values of tokens 310B-310F can be combined to represent the background image 304 with a single token. In some embodiments, the embedding generator 108 creates tokens 310A-310L using a machine learning model to classify the type of each of the design inputs 306 as image, shape, text, or other types. A position of each design input 306 can be extracted from object data or by performing image segmentation or other methods to define object positions.

The embedding generator can apply a trained machine learning model 318 to the set of tokens 308 and determine token embeddings 122. For instance, the trained machine learning model 318 includes two layers that are trained to generate token embeddings 122 and position embeddings 120 from a given set of tokens. The trained machine learning model 318 maps each token of the set of tokens 308 to a vector value that represents the token such that similar tokens have similar vector values (e.g., a vector value of an embedding space). The position embedding 120 represents a position of each token within the design input (e.g., a first selected design input, a second selected design input, etc.). The output of this model can include the values of the position vector and the values of the token vector that represent the set of tokens 308.

Another trained machine learning model, such as CLIP model 312 can generate the image embedding 114. Similar to as described above, the CLIP model 312 for performing image classification. During the image classification, both the text and visual features are projected to an embedding space with identical dimensions. These embedding spaces can be combined into a single embedding space that represents the text and visual features together in a single vector of values. The output of CLIP model 312 can include the vector (e.g., a mathematical representation of the embedding space) for use by the layout generator 116.

An aggregate embedding 316 is generated by an embedding aggregator 314. The embedding aggregator 314 combines the image embedding 114, the token embedding 122 and the position embedding 120. For example, in some embodiments, the embedding aggregator concatenates the embeddings. The concatenation can be performed using vector operations. After concatenation, the aggregate embedding 316 is processed by the layout generator as described above. In some embodiments, a similarity value can also be provided to the layout generator in the design inputs 302. Using the similarity value, the layout generator 116 generates recommended layouts that are more or less similar to the existing layout. For instance, the similarity value ranges between [0, 1] and the layout generator creates recommended layouts that are more similar to the existing layout as the similarity value increases.

Figure 4:
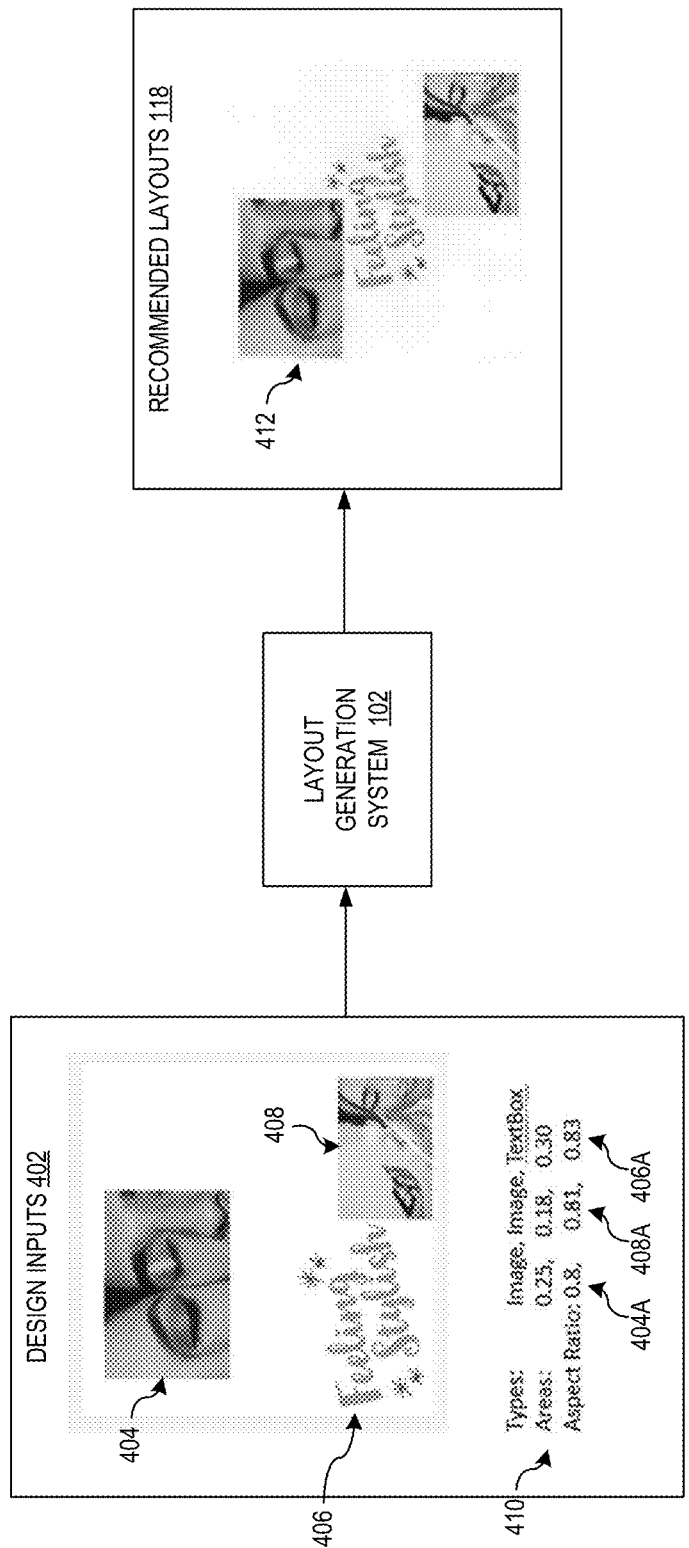
FIG. 4 depicts an example of generating a layout recommendation from design inputs preserving features of the design inputs in accordance with one or more embodiments.

FIG. 4 depicts an example of generating a layout recommendation from design inputs preserving features of the design inputs in accordance with one or more embodiments. For instance, the layout generation system 102 can preserve area, aspect ratio, or other features of the design inputs that are desired during layout generation.

As illustrated by FIG. 4, the design inputs include an area and an aspect ratio that corresponds to each of the visual components of the design inputs. The image 404 has a first set of features 404A that define an area of 0.25 and an aspect ratio of 0.8 for the image 404. The area is expressed as a portion of the total image (e.g., 0.25=¼ of the total image area). The image 408 has a second set of features 408A that define an area of 0.18 and an aspect ratio of 0.81 for the image 408. The text box 406 has a third set of features 406A that define an area of 0.30 and an aspect ratio of 0.83 for the text box 406. As described above, the design inputs 402 are processed by the layout generation system 102. The layout generator produces a set of recommended layouts 410 that includes recommended layout 412 preserves the area and aspect ratio of the design inputs 402. As illustrated in FIG. 4, the aspect ratio of the image 404 and the corresponding feature of recommended layout 412 have a common aspect ratio and area.

Figure 5:
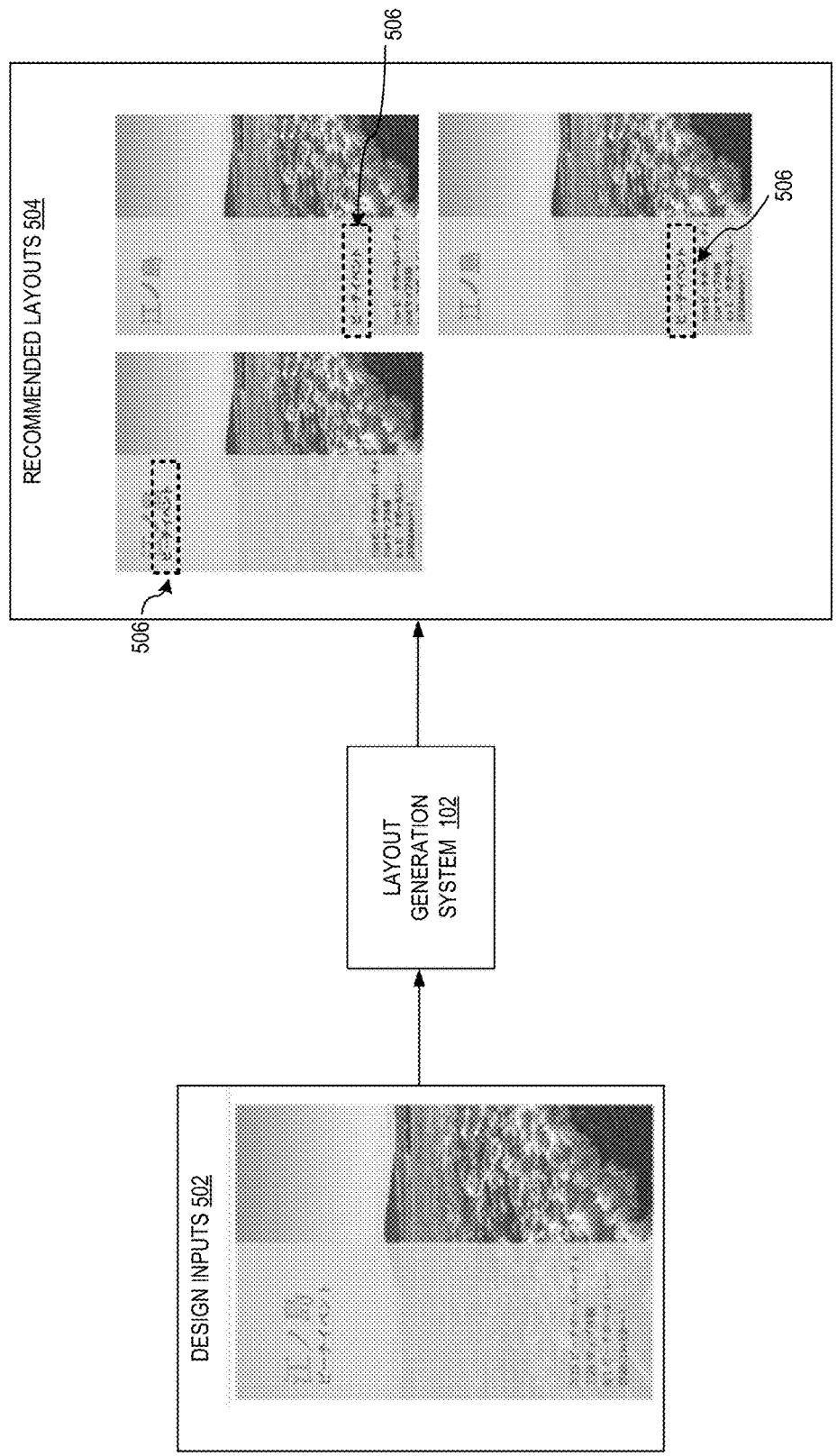
FIG. 5 illustrates an example comparison of generating a layout recommendation from design inputs including an existing layout in accordance with one or more embodiments.

FIG. 5 illustrates an example comparison of a set of recommended layouts from design inputs including an existing layout in accordance with one or more embodiments. As described above, the design inputs 502 are processed by the embedding generator and the layout generator to produce the set of recommended layouts 504. In the example illustrated by FIG. 5, the set of recommended layouts 504 includes three recommended layouts that have varied positions of the design element 506, that is a text box.

Figure 6:
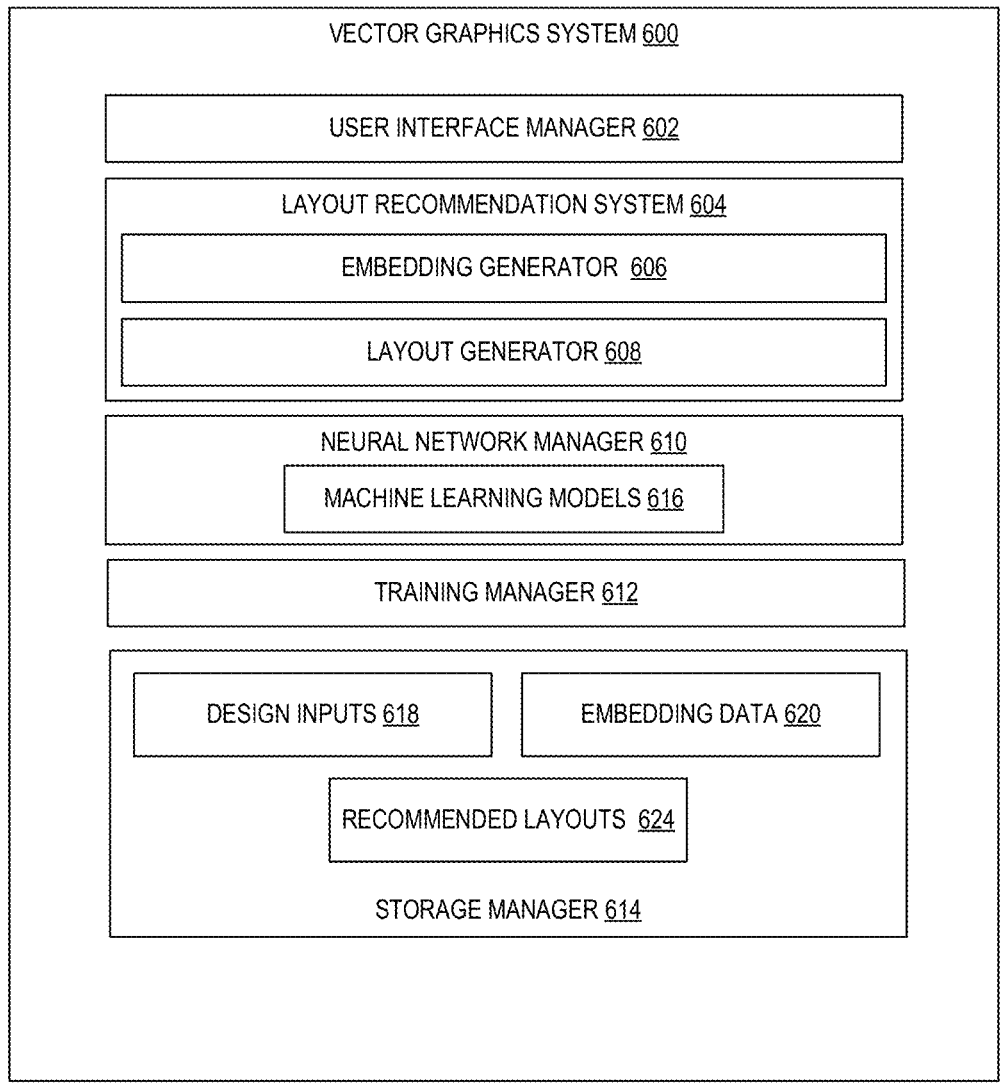
FIG. 6 illustrates a schematic diagram of a vector graphics system in accordance with one or more embodiments.

FIG. 6 illustrates a schematic diagram of a vector graphics system 600 including a layout recommendation system in accordance with one or more embodiments. As shown, the vector graphics system 600 may include but is not limited to user interface manager 602, layout recommendation system 604, machine learning models 616, training manager 612, and storage manager 614. The layout recommendation system 604 includes embedding generator 606 and layout generator 608. The storage manager 614 includes design inputs 618, embedding data 620, machine learning models 616, and recommended layouts 624.

As illustrated in FIG. 6, the vector graphics system 600 includes a user interface manager 602. For example, the user interface manager 602 allows users to select design inputs 618 for layout generation by the vector graphics system 600. In some embodiments, the user interface manager 602 provides a user interface through which the user can upload one or more files that include the design inputs or select each design input from a library of existing design inputs as discussed above. Alternatively, or additionally, the user interface manager 602 may enable the user to download the recommended layouts 624 from a local or remote storage location (e.g., by providing an address (e.g., a URL or other endpoint) associated with recommended layouts 624. In some embodiments, the user interface manager 602 can enable a user to link a library of design inputs 618 including multiple groups of linked design inputs (e.g., a first group including three design inputs, a second group containing six design inputs, etc.) for asynchronous batching of layout generation by the vector graphics system.

As illustrated in FIG. 6, the vector graphics system 600 also includes a layout recommendation system 604. The layout recommendation system 604 receives design inputs 618 (e.g., identified by design input selections 106 of FIG. 1) and generates a recommended layouts 624 using the embedding generator 606 and the layout generator 608. The layout recommendation system 604 outputs the recommended layouts 624 to the user interface of the user interface manager 602.

As illustrated in FIG. 6, the layout recommendation system 604 also includes an embedding generator 606. The embedding generator 606 tokenizes the design inputs 618 and generates embeddings that represent the design inputs 618. To generate the embeddings, the embedding generator accesses one of the machine learning models 616 using the neural network manager 610 to apply the machine learning model to the set of tokens as described above.

As illustrated in FIG. 6, the layout recommendation system 604 also includes a layout generator 608. The layout generator 608 generates recommended layouts from the tokens output from the embedding generator 606 as described above. The layout generator 608 is an autoregressive language model based on the transformer architecture that is trained to generate a new layout based on input embeddings that represent the tokens (e.g., existing features for a layout). The layout generator 608 generates a token sequence that represents positions, sizes, and orientations of design inputs in a recommended layout.

As illustrated in FIG. 6, the vector graphics system 600 also includes a neural network manager 610. Neural network manager 610 may host a multitude of neural networks or other machine learning models, such as machine learning models 616. The neural network manager 610 may include an execution environment, libraries, and/or any other data needed to execute the machine learning models. In some embodiments, the neural network manager 610 may be associated with dedicated software and/or hardware resources to execute the machine learning models. As discussed, machine learning models 616 include trained machine learning models to generate embeddings from tokens, generate image embeddings, or a generative pretrained transformer (GPT) to generate recommended layouts. The GPT (e.g., layout generator 116 of FIG. 1) can be implemented as any type of transformer, such as an encoder-decoder architecture with a self-attention mechanism. In various embodiments, multiple machine learnings models (GPT, embedding generators) hosted by neural network manager 610 may be the same type of model or may be different types of models, depending on implementation. Although depicted in FIG. 6 as being hosted by a single neural network manager 610, in various embodiments the neural networks may be hosted in multiple neural network managers and/or as part of different components. For example, each model of the machine learning models 616 can be hosted by their own neural network manager, or another host environment, in which the respective neural networks execute, or the machine learning models 616 may be spread across multiple neural network managers. This will depend on, e.g., the resource requirements of each machine learning model, etc.

As further illustrated in FIG. 6, the neural network manager 610 includes machine learning models 616. The machine learning models 616 may include a set of files for each machine learning model such as a model architecture, model weights, and can include a link (URL to the training data). In some embodiments, the model architecture and model weights can be stored using JavaScript Object Notation (JSON) or by serializing the machine learning model into a data stream such as a byte stream. The machine learning models 616 can include the model architecture and model weights for multiple machine learning models such as the embedding generator and the layout generator.

As illustrated in FIG. 6 the vector graphics system 600 also includes training manager 612. The training manager 612 can teach, guide, tune, and/or train one or more neural networks. In particular, the training manager 612 can train a neural network based on a plurality of training data. For example, the machine learning models 616 can include some models trained to generate embedding spaces to represent various types of design inputs and other models, such as the layout generator, trained to generate recommended layouts using the embedding spaces. Additionally, the machine learning models 616 may be further optimized using loss functions, as discussed above, by backpropagating gradient descents. More specifically, the training manager 612 can access, identify, generate, create, and/or determine training input and utilize the training input to train and fine-tune a neural network. For instance, the training manager 612 can train each of the machine learning models 616, end-to-end, as discussed above.

As illustrated in FIG. 6, the vector graphics system 600 also includes the storage manager 614. The storage manager 614 maintains data for the vector graphics system 600. The storage manager 614 can maintain data of any type, size, or kind as necessary to perform the functions of the vector graphics system 600. The storage manager 614, as shown in FIG. 6, includes the design inputs 618. The design inputs 618 can include a plurality of graphic design files that combine to form content layouts. In particular, the design inputs 618 include a selection of shape elements, text elements, and/or image elements received from the user via the user interface manager 602.

As further illustrated in FIG. 6, the storage manager 614 also includes embedding data 620. Embedding data 620 can include information used as input to the layout generator 608 and represents the sets of tokens (e.g., design inputs) received by the vector graphics system 600. Embedding data 620 includes vector representations of design inputs that have been received and processed by the vector graphics system. In some embodiments, the embedding data 620 is cumulative of all previously received design inputs.

As further illustrated in FIG. 6, the storage manager 614 also includes recommended layouts 624. The recommended layouts 624 are files that include various design inputs arranged in a particular configuration. The recommended layouts 624 are generated by the layout generator 608 and can be presented to the user via the user interface manager 602.

Each of the components 602-614 of the vector graphics system 600 and their corresponding elements (as shown in FIG. 6) may be in communication with one another using any suitable communication technologies. It will be recognized that although components 602-614 and their corresponding elements are shown to be separate in FIG. 6, any of components 602-614 and their corresponding elements may be combined into fewer components. As such, a single facility or module, divided into more components, or configured into different components may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the vector graphics system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the vector graphics system 600 may, for example, implement as one or more stand-alone applications or as one or more modules of an application. Also, as one or more plug-ins, as one or more library functions and/or functions that may be called by other applications, and/or as a cloud-computing models. Thus, the components 602-614 of the vector graphics system 600 may be implemented as a stand-alone application, such as a desktop or mobile application. Furthermore, the components 602-614 of the vector graphics system 600 may be implemented as one or more web-based applications hosted on a remote server. Alternatively, or additionally, the components of the vector graphics system 600 may be implemented in a suite of mobile device applications or "apps."

Figure 7:
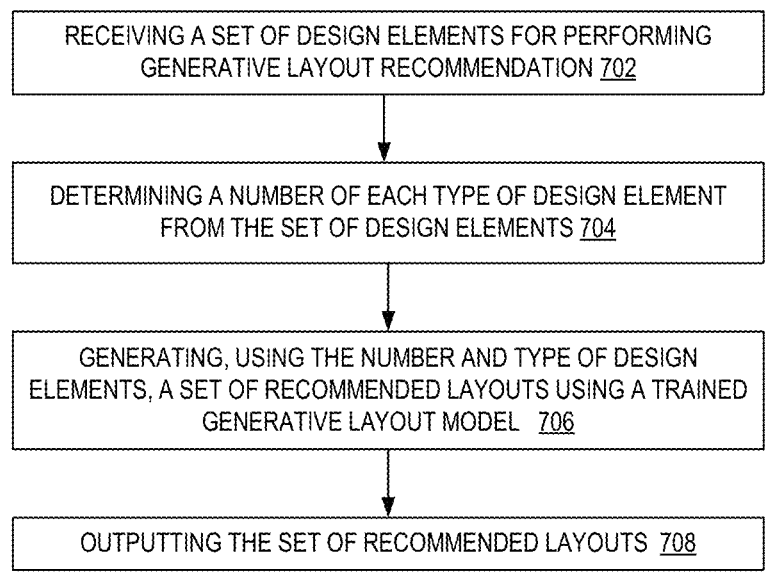
FIG. 7 illustrates a flowchart of a series of acts in a method of generating recommended layouts from design inputs in accordance with one or more embodiments.

FIGS. 1-6, the corresponding text, and the examples, provide a number of different systems and devices that allow a user to generate recommended layouts from the design inputs identified by design input selections. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of generating recommended layouts from design inputs in accordance with one or more embodiments. In one or more embodiments, the method 700 is performed in a digital medium environment that includes the vector graphics system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving a set of design elements for performing generative layout recommendation. As described above, the layout generation system obtains design input selections that identify a set of design inputs such as text, images, or shapes that are selected for generating a recommended layout. In some embodiments, the design input selections 106 include an existing layout that includes positions and sizes for each of the design inputs relative to the other design inputs in the set of design inputs.

As illustrated in FIG. 7, the method 700 includes an act 704 of determining a number of each type of design element from the set of design elements. To determine a number of each type, the design inputs are tokenized by the embedding generator with each token each token representing a design element of the set of design elements. Each token of the set of tokens identifies a type, a position, and a size of the design element. As described above, each design input has a type such as text region, image region, background region, or design region. A set of tokens is generated using metadata of the design input (e.g., object type data), identified by a user selection of type, or using other processes such as an image segmentation or object identification model.

As illustrated in FIG. 7, the method 700 includes an act 706 of generating, using the number and type of design elements, a set of recommended layouts using a trained generative layout model. As described above, the layout generator generates a set of recommended layouts from the received embeddings. The layout generator uses deep learning to produce recommended layouts from a set of embeddings that represent existing tokens (e.g., existing design inputs). The set of embeddings is created by generating a token embedding and a position embedding for each token of the set of tokens and forming an aggregate embedding using a combination of the token embedding and a position embedding. A machine learning prediction that includes an arrangement of tokens is generated by the layout generator. The arrangement of tokens represents a new layout, with each token in the arrangement corresponding to one of the tokens representing the design inputs. In some embodiments, the layout generator receives the number and type of design elements and creates one or more recommended layouts for the set of recommended layouts. Each layout in the one or more recommended layouts includes a different size or location for the number and type of design elements. In some embodiments, the layout generator receives a similarity metric that represents a requested similarity or difference between the set of recommended layouts and the set of design elements. The layout generator creates recommended layouts for the set of recommended layouts using the similarity metric to guide the similarity of the arrangement of tokens to the existing arrangement of tokens that represents the existing layout of the design inputs. In embodiments when an existing layout with positions and sizes for each design element, the layout generator can retain the size of each design element.

As illustrated in FIG. 7, the method 700 includes an act 708 of outputting the set of recommended layouts. The set of recommended layouts includes one or more layouts generated by the layout generator. As described above, the set of recommended layouts can be presented to the user via a user interface or stored in a cache or non-volatile memory device.

In some embodiments, the method 700 also includes receiving a selection of a layout from the set of recommended layouts. The selected layout can be stored in a database of layouts generated by the trained generative layout model.

Figure 8:
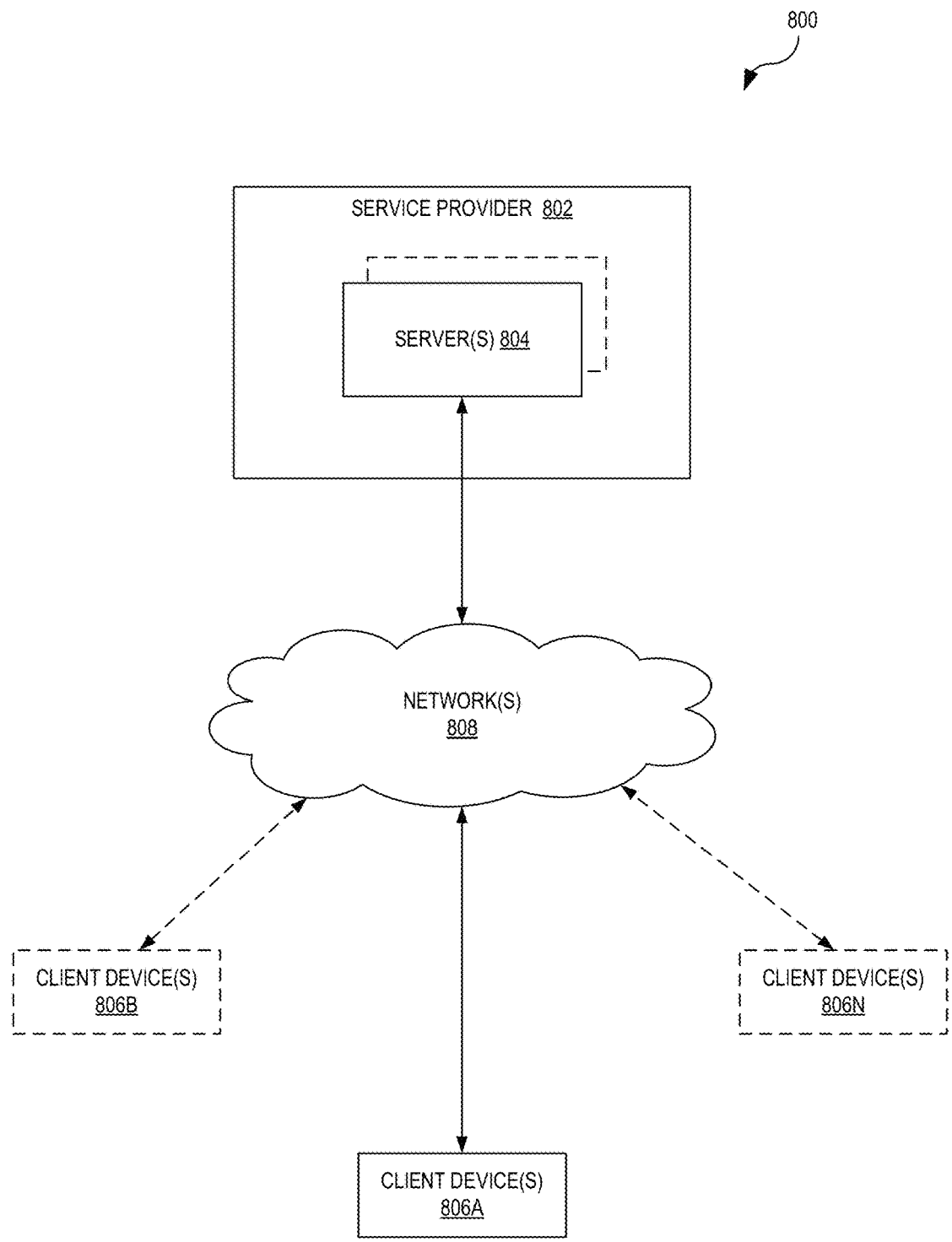
FIG. 8 illustrates a schematic diagram of an exemplary environment in which the vector graphics system can operate in accordance with one or more embodiments.

FIG. 8 illustrates a schematic diagram of an exemplary environment 800 in which the vector graphics system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications. Such examples of which will be described in more detail below with respect to FIG. 8.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the vector graphics system 600. In particular, the vector graphics system 600 may be implemented in whole or in part on the client device 806A.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 8. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access service provider 802 and server 804, or vice versa. The one or more networks 808 will be discussed in more detail below with regard to FIG. 8.

In addition, the environment 800 may also include one or more servers 804. The one or more servers 804 may generate, store, receive, and transmit any type of data, including design inputs 618, embedding data 620, machine learning models 616, recommended layouts 624, or other information. For example, a server 804 may receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 8.

As mentioned, in one or more embodiments, the one or more servers 804 can include or implement at least a portion of the vector graphics system 500. In particular, the vector graphics system 500 can comprise an application running on the one or more servers 804 or a portion of the vector graphics system 500 can be downloaded from the one or more servers 804. For example, the vector graphics system 500 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide access to design inputs, embedding data, or recommended layouts (e.g., design inputs 618, embedding data 620, machine learning models 616 or recommended layouts 624, etc.) stored at the one or more servers 804. Moreover, the client device 806A can receive a request (i.e., via user input) to generate a recommended layout from a set of design inputs and provide the request to the one or more servers 804. Upon receiving the request, the one or more servers 804 can automatically perform the methods and processes described above to generate the recommended layout. The one or more servers 804 can provide all or portions of the recommended layout, to the client device 806A for presentation to the user.

As just described, the vector graphics system 600 may be implemented in whole, or in part, by the individual elements 802-808 of the environment 800. It will be appreciated that although certain components of the vector graphics system 600 are described in the previous examples with regard to particular elements of the environment 800, various alternative implementations are possible. For instance, in one or more embodiments, the vector graphics system 600 is implemented on any of the client devices 806A-806N. Similarly, in one or more embodiments, the vector graphics system 600 may be implemented on the one or more servers 804. Moreover, different components and functions of the vector graphics system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium. Thus, executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
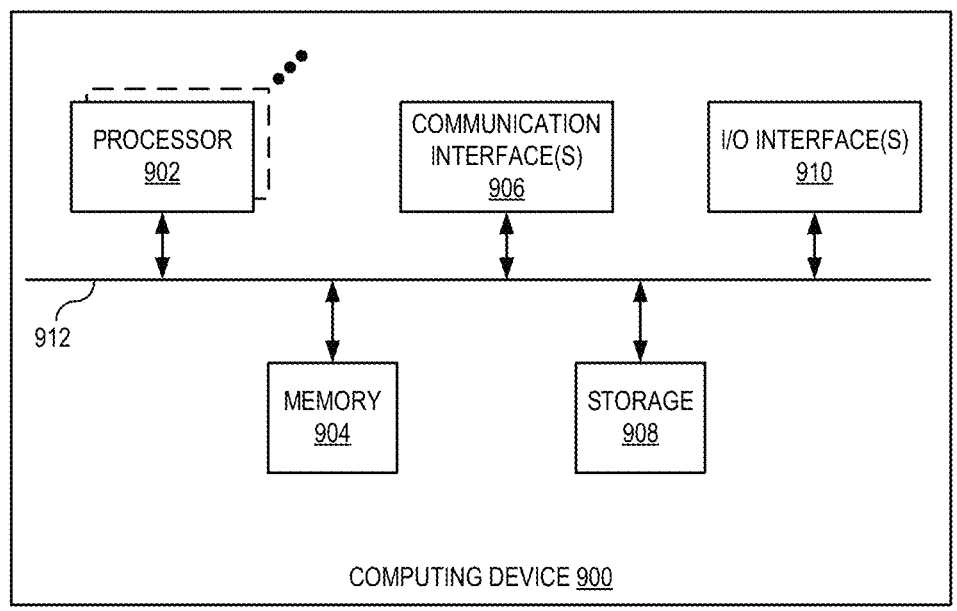
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the vector graphics system 500. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 which includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination of these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers.

In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving, via a user interface, a user selection of a set of design elements for performing generative layout recommendation;
   generating a set of tokens representing design elements of the set of design elements;
   generating, using a first machine learning model, a token embedding and a position embedding for each token of the set of tokens;
   generating, by a second machine learning model, a sequence of tokens corresponding to positions and orientations of the set of design elements using the token embedding and the position embedding for each token of the set of tokens;
   rendering a layout according to the sequence of tokens;
   receiving a selection of a similarity metric that represents a requested similarity or difference between a set of recommended layouts and the set of design elements;
   creating one or more recommended layouts for the set of recommended layouts, wherein each layout in the one or more recommended layouts is created using the similarity metric; and
   outputting the set of recommended layouts to a user via the user interface, wherein the set of recommended layouts includes one or more rendered layouts and wherein each layout of the one or more rendered layouts includes an arrangement of the user selected set of design elements in a graphical output visualization.

2. The method of claim 1, further comprising:
   determining a number of each type of design element from the set of design elements, wherein the type of design element includes one or more of a text region, image region, background region, or design region.

3. The method of claim 2, further comprises:
   receiving, by the second machine learning model, the number and type of design elements, wherein the sequence of tokens corresponds to the number and type of design element, and wherein each layout in the one or more rendered layouts includes a different size or location for the number and type of design element.

4. The method of claim 1, wherein the set of design elements includes a predesigned layout that defines a position and size of each design element in the set of design elements, and wherein the set of recommended layouts retains the size of each design element.

5. The method of claim 1 further comprising:
   receiving a selection of a layout from the set of recommended layouts; and
   storing the selected layout in a database of layouts generated by the second machine learning model.

6. The method of claim 1, wherein each token of the set of tokens identifies a type, a position, and a size of a design element of the set of design elements.

7. The method of claim 1, further comprising:
   forming an aggregate embedding using a combination of the token embedding and a position embedding.

8. A system comprising:
   a memory component; and
   a processing device coupled to the memory component, the processing device to perform operations comprising:
   receiving, via a user interface, a user selection of a set of design elements for performing generative layout recommendation;
   generating a set of tokens representing design elements of the set of design elements;
   generating, using a first machine learning model, a token embedding and a position embedding for each token of the set of tokens;
   generating, by a second machine learning model, a sequence of tokens corresponding to positions and orientations of the set of design elements using the token embedding and the position embedding for each token of the set of tokens;
   rendering a s layout according to the sequence of tokens;
   receiving a selection of a similarity metric that represents a requested similarity or difference between a set of recommended layouts and the set of design elements;
   creating one or more recommended layouts for the set of recommended layouts, wherein each layout in the one or more recommended layouts is created using the similarity metric; and
   outputting the set of recommended layouts to a user via the user interface, wherein the set of recommended layouts includes one or more rendered layouts and wherein each layout of the one or more rendered layouts includes an arrangement of the user selected set of design elements in a graphical output visualization.

9. The system of claim 8, the operations further comprising:
   determining a number of each type of design element from the set of design elements, wherein the type of design element includes one or more of a text region, image region, background region, or design region.

10. The system of claim 9, further comprises:
receiving, by the second machine learning model, the number and type of design elements, wherein the sequence of tokens corresponds to the number and type of design element, and wherein each layout in the one or more rendered layouts includes a different size or location for the number and type of design element.

11. The system of claim 8, wherein the set of design elements includes a predesigned layout that defines a position and size of each design element in the set of design elements, and wherein the set of recommended layouts retains the size of each design element.

12. The system of claim 8, the operations further comprising:
receiving a selection of a layout from the set of recommended layouts; and
storing the selected layout in a database of layouts generated by the second machine learning model.

13. The system of claim 8, wherein each token of the set of tokens identifies a type, a position, and a size of a design element of the set of design elements.

14. The system of claim 8, the operations further comprising:
forming an aggregate embedding using a combination of the token embedding and a position embedding.

15. A non-transitory computer-readable medium storing executable instructions, which when executed by a processing device, cause the processing device to perform operations comprising:
receiving, via a user interface, a user selection of a layout that includes at least one design element of a set of design elements;
generating, using a first machine learning model, an image embedding of the layout;
generating a set of tokens, each token representing a design element of the set of design elements, wherein each token of the set of tokens identifies a type, a position, and a size of the design element;
generating, using the first machine learning model, a token embedding and a position embedding for each token of the set of tokens;
forming an aggregate embedding using a combination of the image embedding, the token embedding and the position embedding;
generating, by a second machine learning model, a sequence of tokens corresponding to positions and orientations of the set of design elements using the aggregate embedding;
rendering a layout according to the sequence of tokens;
receiving a selection of a similarity metric that represents a requested similarity or difference between a set of recommended layouts and the layout;
creating one or more recommended layouts for the set of recommended layouts, wherein each layout in the one or more recommended layouts is created using the similarity metric; and
outputting the set of recommended layouts to a user via the user interface, wherein the set of recommended layouts includes one or more rendered layouts and wherein each layout of the one or more rendered layouts includes an arrangement of the layout and the at least one design element of the set of design elements in a graphical output visualization.

16. The non-transitory computer-readable medium of claim 15, wherein the type of design element is a text box, a title, a list, a table, or a figure.

17. The non-transitory computer-readable medium of claim 15, wherein the operation of generating, using the first machine learning model, the token embedding and the position embedding causes the processing device to perform operations comprising:
generating an image from the layout including the at least one design element;
processing the image using a trained machine learning model to generate an image embedding from the image; and
forming an image embedding from a combination of a text embedding and an object embedding of the image embedding.

* * * * *